US007373045B2

(12) United States Patent
Levner et al.

(10) Patent No.: US 7,373,045 B2
(45) Date of Patent: May 13, 2008

(54) METHOD AND APPARATUS FOR PROCESSING OPTICAL SIGNALS WITH SUPERGRATINGS

(75) Inventors: Daniel Levner, Toronto (CA); Martin F. Fay, Providence, RI (US)

(73) Assignee: Brown University Research Foundation, Providence, RI (US)

(*) Notice: Subject to any disclaimer, the term of this patent is extended or adjusted under 35 U.S.C. 154(b) by 604 days.

(21) Appl. No.: 10/188,530

(22) Filed: Jul. 3, 2002

(65) Prior Publication Data

US 2003/0007733 A1 Jan. 9, 2003

Related U.S. Application Data

(60) Provisional application No. 60/302,904, filed on Jul. 3, 2001.

(51) Int. Cl.
*G02B 6/34* (2006.01)
(52) U.S. Cl. ............................ 385/37; 385/24; 385/123
(58) Field of Classification Search .................. 385/37, 385/42, 50, 129
See application file for complete search history.

(56) References Cited

U.S. PATENT DOCUMENTS

| | | | | |
|---|---|---|---|---|
| 6,002,822 A | | 12/1999 | Strasser et al. ............... 385/48 |
| 6,084,997 A | * | 7/2000 | Utaka et al. .................. 385/37 |
| 6,141,370 A | * | 10/2000 | Avrutsky et al. ............. 372/102 |
| 6,181,852 B1 | | 1/2001 | Adams et al. ................. 385/37 |
| 6,208,773 B1 | * | 3/2001 | Wickham et al. .............. 385/10 |
| 6,289,032 B1 | | 9/2001 | Fay et al. .................... 372/102 |
| 6,334,013 B1 | * | 12/2001 | Laming et al. ............... 385/37 |
| 6,393,172 B1 | | 5/2002 | Brinkman et al. ............ 385/16 |
| 6,415,081 B1 | | 7/2002 | Levner et al. ................ 385/37 |
| 6,424,763 B1 | * | 7/2002 | Villeneuve et al. ........... 385/27 |
| 6,549,707 B1 | * | 4/2003 | Lupu et al. ................... 385/37 |
| 6,597,838 B1 | * | 7/2003 | Park et al. .................... 385/37 |
| 6,819,460 B1 | * | 11/2004 | Babbitt et al. ................ 359/11 |
| 6,879,441 B1 | * | 4/2005 | Mossberg ..................... 359/569 |
| 2002/0061047 A1 | | 5/2002 | Fish et al. .................... 372/102 |

FOREIGN PATENT DOCUMENTS

JP 08-184789 * 7/1996

OTHER PUBLICATIONS

Ivan A. Avrutsky, Dave S. Ellis, Alex Tager, Hanan Anis, and J.M. Xu "Design of widely tunable semiconductor lasers and the concept of Binary Superimposed Gratings (BSG's)", IEEE Journal of Quantum Electron., vol. 34, pp. 729-741, 1998.

(Continued)

*Primary Examiner*—Frank G. Font
*Assistant Examiner*—Eric Wong
(74) *Attorney, Agent, or Firm*—Dorsey & Whitney, LLP

(57) ABSTRACT

An optical component including at least one optical supergrating is provided. The optical supergrating includes a quantized refractive index profile adapted to exhibit a finite plurality of refractive indexes; which in turn are adapted to generate a reflectance spectrum in at least one spectral band corresponding to a Fourier transformed analog refractive index profile.

32 Claims, 9 Drawing Sheets

OTHER PUBLICATIONS

Bismuth, J., Superimposed gratings WDM on Ge-Doped silica on silicon planar waveguide Lasers and Electro-Optics, 1996. CLEO '96, Jun. 1996, pp. 513-514.

Avrutsky, I.A., et al., "Binary Superimposed Grating for Tunable DBR Laser Optical Fiber Communication Conference and Exhibit, 1998", OFC '98, Technical Digest, Feb. 1998, pp. 383-386.

Chik, H., "A 1×8 Supergrating Tap-off WDM device Lasers and Electro-optics Europe, 1996". CLEO/Europe, Sep. 1996, p. 231.

Salvik, R., "High Performance All-Fiber Fabry-Perot Filters with Superimposed Chirped Bragg Gratings", Journal of Lightwave Technology, Apr. 2003, vol. 21, No. 4, pp. 1059-1065.

* cited by examiner

METHOD AND APPARATUS FOR PROCESSING OPTICAL SIGNALS WITH SUPERGRATINGS

CLAIM OF PRIORITY FROM COPENDING PROVISIONAL PATENT APPLICATIONS

Priority is herewith claimed under 35 U.S.C. §119(e) from co-pending provisional patent application 60/302,904, filed Jul. 3, 2001, entitled "Method and Apparatus for Detecting Optical Signals With Binary Supergratings", by Daniel Levner and Martin Fay. The disclosure of said provisional patent application is incorporated by reference in its entirety.

Priority is herewith claimed under 35 U.S.C. §119(e) from co-pending provisional patent application Ser. No. 60/393,209 filed Jul. 1, 2002, entitled "Method and Apparatus for Detecting Multiple Optical Wavelengths", by Daniel Levner and Martin Fay. The disclosure of said provisional patent application is incorporated by reference in its entirety.

CROSS-REFERENCE TO RELATED APPLICATIONS

This application is also related to co-pending U.S. Application Ser. No. 10/144,892 filed on May 13, 2002, now issued as U.S. Pat. No. 6,657,786 B2, and entitled "Synthesis of Supergratings by Fourier Methods", by Daniel Levner, Martin Fay, and Jingming Xu. The disclosure of this non-provisional Patent Application is incorporated by reference herein in its entirety.

BACKGROUND OF THE INVENTION

1. Field of the Invention

The present invention relates generally to processing optical signals, and more particularly to routing, filtering and detecting optical signals.

2. Prior Art

Gratings are optical devices used to achieve wavelength-dependent characteristics by means of optical interference effects. These wavelength-dependent optical characteristics can, for instance, serve to reflect light of a specific wavelength while transmitting or refracting light at all other wavelengths. Such characteristics are useful in a wide range of situations, including the extraction of individual wavelength-channels in Wavelength Division Multiplexed (WDM) optical communication systems, or providing wavelength-specific feedback for tunable or multi-wavelength semiconductor lasers. Gratings are usually implemented by modulating (varying) the effective index of refraction of a wave-guiding structure. These changes in index of refraction cause incident light wavelengths to be reflected or refracted: in the case of an abrupt interface between two index values, light incident directly on the interface is reflected according to the well-known Fresnel reflection law.

The term "multi-wavelength grating" generally refers to a grating that is capable of exhibiting optical characteristics at a number of wavelengths. For example, a multi-wavelength grating may be a grating that reflects light at several select wavelengths (which may correspond to specific optical communication channels), yet is transparent to light at other wavelengths. In some situations, however, there is a need to set the optical characteristics for a continuous range of wavelengths, rather than at specific wavelength values; for example, when using an optical grating to compensate for the unevenness of optical gain profiles in laser cavities and optical amplifiers. However, achieving this requirement for a continuous range of wavelengths is difficult to meet with traditional grating technologies.

Similarly, a range of optical wavelengths may be used where many communication channels are encoded into a single optical cable by utilizing different wavelengths of light; this is more commonly known as Wavelength Division Multiplexing (WDM) technology. Periodic gratings are often used to separate or process these channels. However, periodic grating technologies process one wavelength, forcing devices intended to process multiple wavelengths to employ multiple single-wavelength periodic gratings. This is not an attractive solution because, on top of the additional losses that each grating creates, even a single grating occupies a considerable amount of space by today's standards of integration and miniaturization. It is thus desired to have a single device capable of processing several wavelengths in a space-efficient manner.

In the field of semiconductor lasers, the output wavelength of semiconductor lasers is largely determined by the presence of "feedback elements" around or inside the laser gain section, which act to reflect light at the desired wavelength back into the laser. For multi-wavelength operation, multi-wavelength feedback is needed. Again, single-wavelength grating technology can only address this demand with a cascade of simple gratings, leading to the same (if not more notable) loss and space problems mentioned above.

In the field of optical transmission, it is well known that optical networks must contend with a property known as dispersion. This property arises from the wavelength-dependence of effective index, which in turn produces a wavelength-dependent group delay spectrum for a given type and length of optical fiber. Since an optical pulse always possesses some spectral width, this wavelength-dependence leads to different retardation of various spectral components of the optical pulse, thereby leading to its spread in the spatial domain. This spread directly impedes the operation of the optical network. Some forms of dispersion can be corrected for with single-wavelength gratings, but only on a channel by channel basis. More complicated forms of dispersion such as dispersion slope cannot be suitably corrected by single-wavelength gratings at all.

One such single-wavelength grating device is a Bragg Grating. The Bragg Grating consists of a periodic variation in refractive index and acts as a reflector for a single wavelength of light related to the periodicity (known as pitch, $\Lambda$) of the index pattern; and is frequently used in both semiconductor systems and fiber-optic systems. In practice, the Bragg Grating can usually reflect at several wavelengths, corresponding to overtones of its fundamental pitch; however, these higher-order wavelengths tend to be at quite different spectral regions than that of the fundamental wavelength, thus not making the Bragg Grating useful as a multi-wavelength reflector. Moreover, these higher-order wavelengths cannot be tuned independently of one another.

Other multi-wavelength grating technologies include: analog superimposed gratings, Sampled Gratings (SG), Super-Structure Gratings (SSG), Chirped Bragg Gratings, Dammann Gratings, Arrayed Waveguide Gratings (AWG), Echelle Gratings and Binary Superimposed Gratings (BSG).

Analog superimposed gratings are a generalization of the Bragg Grating and are rooted in a principle of superposition: a grating profile consisting of the sum of the index profiles of single-wavelength gratings reflects at all of its constituent wavelengths. Such a grating relies on an analog index variation, that is, a refractive index that changes continuously along the grating length. However, it is difficult to inscribe strong analog gratings using the well-known photorefractive effect, since the change of index under illumination varies non-linearly with stronger exposures, making the writing process difficult in semiconductors where surface relief gratings are used. It is also very difficult and generally impractical to reproducibly etch analog features into the surface of the semiconductor. The latter difficulty brought about the introduction of binary gratings, i.e., gratings that rely only on two refractive index values corresponding to the material being etched or not etched, illuminated or not illuminated.

Two representations of multi-wavelength binary gratings are sampled gratings (SG) and superstructure gratings (SSG). The SG is constructed with alternating sections of grating and grating-free regions of the waveguide. The alternating sections produce diffraction spectra consisting of multiple reflectance peaks contained within a (typically) symmetric envelope. The SG is intrinsically limited in the flexibility in the location and relative strength of reflectance peaks, and, because of the large fraction of grating-free space, is also spatially inefficient. The SG is therefore particularly unsuitable where a short grating is required or where waveguide losses are high.

With the super-structure grating (SSG), the grating period is chirped by finely varying the grating pitch, which corresponds to the length of one tooth-groove cycle. This can also be thought of as a sequence of finely tuned phase shifts; common phase profiles include linear and quadratic chirp. Such an implementation in principle allows arbitrary peak positions and relative heights, but only at the expense of extremely high resolution, corresponding to a very small fraction of the size of the grating teeth themselves.

Chirped Bragg Gratings are grating devices targeted at applications such as dispersion compensation and optical pulse compression. Here a Bragg grating's pitch $\Lambda$ is varied along its length. This produces a wavelength-dependent phase spectrum which can be tailored to provide the desired group delay spectrum: $\tau_g = -d\phi/d\omega$. The delay for a given free-space wavelength $\lambda_0$ then follows from the round-trip distance to where local pitch has $\lambda_0$ as its Bragg wavelength: $\tau_g(\lambda_0) = 2n_{eff} z(\lambda_0)$, where $z(\lambda_0)$ is the spatial coordinate at which $\Lambda(z) = \lambda_0 / 2n_{eff}$. In practice, however, these implementations suffer from excessive group-delay ripple, indicating that the dispersion compensation is not complete.

Dammann Gratings are binary gratings devices wherein the grating features are imposed on some surface and wherein the incident light illuminates the surface at some normal or off-normal angle. The optical wavefront incident on this grating experiences a one-time interaction with the grating features and thereby experiences Raman-Nath type diffraction (as opposed to Bragg diffraction). This device is intended for free-space use and is not easily employed in guided-wave applications. Furthermore, to achieve the wavelength resolution requirements imposed by modern optical communication systems the incident light must be collimated to a very high degree, which can prove difficult in practice.

Arrayed Waveguide Gratings (AWG) are used primarily to spatially separate optical channels in a WDM environment. They operated by dividing input multi-wavelength light between an array of waveguides, wherein each waveguide is of a slightly different optical length. The resulting optical phase differences between the waveguides' respective outputs leads to a wavelength-dependent interference pattern, which with proper design can lead to a separation of wavelength components. In practice, this technology requires vast amounts of semiconductor real estate and imposes extreme manufacturing constraints.

Echelle gratings are also used primarily to spatially separate optical channels in a WDM environment. Here, a grating plane is generated by means of defining subwavelength reflective features at various glazing angles and potentially along some curved plane. The grating plane is then illuminated with multi-wavelength light, often at an oblique angle, and the individual reflections add up to substantially separate the wavelength components. The device tends to be very difficult to implement in practice, requiring both deep and flat etching characteristics when implemented in semiconductor.

Prior art regarding binary superimposed grating synthesis is presented in Ivan A. Avrutsky, Dave S. Ellis, Alex Tager, Hanan Anis, and J. M. Xu, "Design of widely tunable semiconductor lasers and the concept of Binary Superimposed Gratings (BSG's)," *IEEE J. Quantum Electron.*, vol. 34, pp. 729-740, 1998.

Older methods in the prior art address the synthesis of "multi-peak" gratings—i.e., gratings characterized by reflectance at several "peaks", which can be controlled in their position and strength. In these methods, a grating engineer begins with a set of sinusoids, each sinusoid corresponding to a single reflectance peak and weighted according to that peak's desired relative strength. These peaks are added together (i.e. superimposed; hence the BSG is known as a superimposed grating) to produce an "analog profile". This profile is then digitally quantized by a simple threshold method. For example, if the analog profile value is positive (above a pre-selected reference) then the corresponding BSG segment is a high or binary 1 index value; if it is negative, the corresponding BSG segment is a low or binary zero index value.

However, this approach is inadequate in at least two areas: firstly, the threshold quantization process introduces intermodulation, which largely limits the applicability of BSGs synthesized in this manner to active applications (laser feedback elements and the like). Secondly, this synthesis procedure is limited to multi-peak gratings, and offers little or no control over the individual peak shape. It is also entirely incapable of generating flat-top channels, as desired by some communication applications, and of generating the near-arbitrary reflectance spectra demanded by some gain- and dispersion-compensation schemes.

Other methods for BSG synthesis include trial-and-error methods that are most often computationally difficult and inefficient.

Therefore, for detecting optical wavelengths in optical devices it is desirable to provide methods and apparatuses for overcoming the disadvantages noted above.

SUMMARY

In accordance with one embodiment of the present invention an optical component including at least one optical supergrating is provided. The at least one optical supergrating includes a quantized refractive index profile adapted to exhibit a finite plurality of refractive indexes; which in turn are adapted to generate a reflectance spectrum in at least one spectral band.

In accordance with another embodiment of the present invention a method of transmitting at least one optical signal from a first point to a second point is provided. The method includes providing at least one first optical waveguide including an optical component. The optical component includes at least one optical supergrating, having a quantized refractive index profile adapted to exhibit a finite plurality of refractive indexes. The finite plurality of refractive indexes are adapted to generate a reflectance spectrum in at least one spectral band corresponding to a Fourier transformed analog refractive index profile. The method includes transmitting the at least one optical signal through the at least one first optical waveguide; and receiving the at least one optical signal at the second point.

In accordance with another embodiment of the invention an optical component including at least one optical supergrating is provided, wherein the at least one optical supergrating comprises a binary quantized refractive index profile adapted to exhibit a finite plurality of refractive indexes. The indexes are adapted to generate a reflectance spectrum in at least one spectral band.

In accordance with another embodiment of the present invention a method of processing at least one optical signal is provided. The method includes providing at least one optical component having at least one optical supergrating. The at least one optical supergrating includes a quantized refractive index profile adapted to exhibit a finite plurality of refractive indexes adapted to generate optical characteristics in at least one spectral band. The method also includes adapting the at least one optical component to affect the at least one optical signal.

In accordance with another embodiment the invention is also directed towards an optical component including at least one optical supergrating. The at least one optical supergrating includes a binary quantized refractive index profile adapted to exhibit a finite plurality of refractive indexes adapted to generate a reflectance spectrum in at least one spectral band.

The invention is also directed towards a method of monitoring the stability of an optical system. The method includes providing at least one optical component having at least one optical supergrating having a quantized refractive index profile. The quantized refractive index profile is adapted to exhibit a finite plurality of refractive indexes adapted to generate optical characteristics in at least one spectral band. The method also includes providing a plurality of optical detectors; providing processing electronics; and adapting the at least one optical component to affect at least one chosen wavelength component to interact with the plurality of optical detectors.

In accordance with another embodiment of the invention, a programmable optical component is provided. The programmable optical component includes at least one optical supergrating having a quantized refractive index profile adapted to exhibit a finite plurality of refractive indexes adapted to generate spectral characteristics in at least one spectral band.

In accordance with another embodiment of the invention an optical component is provided. The optical component includes at least one scattering-reducing optical supergrating having a quantized refractive index profile adapted to exhibit a finite plurality of refractive indexes adapted to generate spectral characteristics in at least one spectral band. The supergrating also has at least one grating feature dimension exceeding grating material wavelength $\lambda_{mat} = \lambda_0/n_{eff}$, and a decay constant of the modal tail less than $1/\lambda_{mat}$ in a predetermined region of the at least one scattering reducing optical supergrating.

In accordance with another embodiment of the invention an optical component is provided. The optical component includes at least one multi-dimensional optical supergrating having a quantized refractive index profile. The quantized refractive index profile is adapted to exhibit a finite plurality of refractive indexes adapted to generate spectral characteristics in at least one spectral band.

The invention is also directed towards an optical coupler system for coupling light between waveguides. The optical coupler includes at least one first optical waveguide and at least one second optical waveguide. The optical coupler also includes at least one optical component optically coupling the light from the at least one first optical waveguide to the at least one second optical waveguide. The at least one optical component includes a quantized refractive index profile, wherein the quantized refractive index profile is adapted to exhibit a finite plurality of refractive indexes adapted to generate spectral characteristics in at least one spectral band.

In accordance with another embodiment of the invention an optical device is provided. The optical device includes at least one optical waveguide having an optical component for reflecting light within the at least one optical waveguide. The optical component includes a quantized refractive index profile adapted to exhibit a finite plurality of refractive indexes adapted to generate spectral characteristics in at least one spectral band. In addition, the optical component includes an optical circulator having at least one optical port, and optically coupled to the at least one optical waveguide and adapted to direct the reflected light to the at least one optical port.

In accordance with another embodiment of the invention an optical dispersion control system is provided. The system includes at least one first optical waveguide adapted to exhibit wavelength-dependent optical phase characteristics. The at least one optical waveguide includes at least one optical component having a quantized refractive index profile adapted to exhibit a finite plurality of refractive indexes adapted to generate spectral characteristics in at least one spectral band.

In accordance with another embodiment of the invention an optical dispersion control system is provided. The system includes an optical coupler system for coupling light between waveguides and adapted to exhibit wavelength-dependent optical phase characteristics. The optical coupler system includes at least one first optical waveguide and at least one second optical waveguide. The system also includes at least one optical component optically coupling the light from the at least one first optical waveguide to the at least one second optical waveguide. The at least one optical component includes a quantized refractive index profile adapted to exhibit a finite plurality of refractive indexes adapted to generate spectral characteristics in at least one spectral band.

In accordance with one embodiment of the invention an optical device for separating wavelength components of an optical signal is provided. The optical device includes at least one optical wavelength separation system having at least one first optical waveguide and at least one second optical waveguide. The optical device also includes at least one optical component optically coupling the at least one optical wavelength from the at least one first optical waveguide to the at least one second optical waveguide. The at least one optical component includes a quantized refractive index profile adapted to exhibit a finite plurality of refractive indexes adapted to generate spectral characteristics in at least one spectral band.

The invention is also directed towards a wavelength stability monitor. The wavelength stability monitor includes a wavelength monitor having at least one optical component. The monitor also includes a quantized refractive index profile adapted to exhibit a finite plurality of refractive indexes adapted to generate spectral characteristics in at least one spectral band. The monitor also includes a plurality of optical detectors coupled to the wavelength monitor which are adapted to generate a deviation signal when a monitored wavelength deviates. In addition a controller coupled to the plurality of optical detectors is adapted to generate an electrical signal corresponding to wavelength deviation.

The invention is also directed towards an optical wavelength equalizer including at least one optical component. The at least one optical component includes a quantized refractive index profile adapted to exhibit a finite plurality of refractive indexes adapted to generate spectral characteristics in at least one spectral band. The optical component is also adapted to adjust wavelength power per wavelength in an optical signal.

In accordance with another embodiment of the invention an optical wavelength monitor is provided. The optical wavelength monitor includes at least one optical component, having a quantized refractive index profile adapted to exhibit a finite plurality of refractive indexes adapted to generate spectral characteristics in at least one spectral band. The at least one optical component is adapted to measure power per wavelength in an optical signal.

In accordance with another embodiment of the invention an optical component is provided. The optical component includes at least one programmable optical supergrating.

The invention is also directed towards an optical component comprising at least one tuneable optical supergrating. The tuneable optical supergrating includes a quantized refractive index profile adapted to exhibit a finite plurality of refractive indexes adapted to generate spectral characteristics in at least one spectral band.

The invention is also directed towards an optical component having at least one optical supergrating adapted to effect optical phase characteristics in at least one spectral band.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
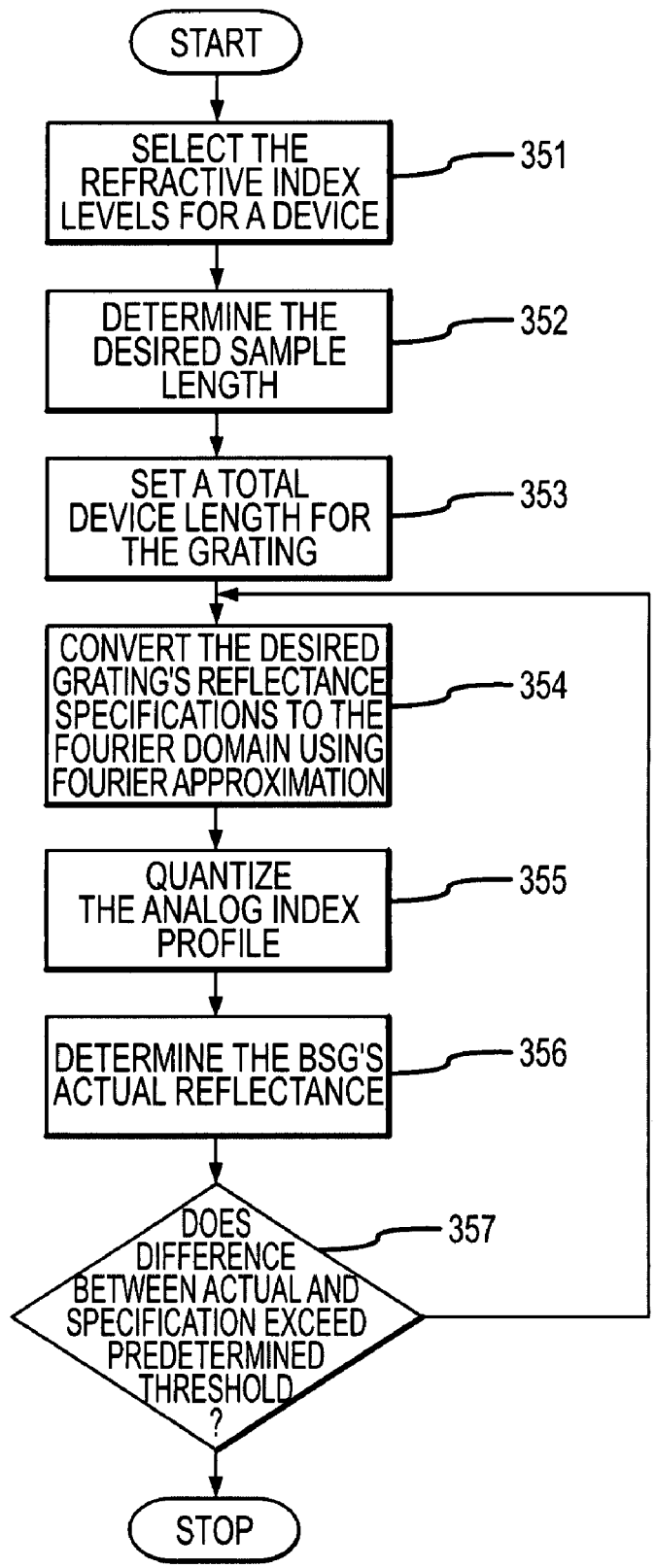
FIG. 1 is a flow chart showing method steps of one method for synthesizing a BSG incorporated by the invention embodiments presented herein.

Although the present invention will be described with reference to the supergrating embodiments as shown in the drawings, it should be understood that the present invention can be embodied in many alternate forms of embodiments, and it is not intended that this invention is limited only to that particular type of embodiment. In alternate embodiments the present invention could be used in any suitable optical device requiring one or more optical gratings.

Starting with supergratings as used here, it will be appreciated that there are three main properties that differentiate the supergrating from other grating technologies. The first is that the supergrating relies on a discrete number of effective refractive index levels. This number is historically 2 and hence the supergrating can take the form of a binary grating, in which case it is known as the Binary Supergrating (BSG) For the sake of clarity and illustration this description will focus on the binary embodiment of the present invention, however, it will be appreciated that in alternate embodiments any suitable number of discrete levels of effective refractive index may be used. The different values of effective refractive index may be attained by varying the real refractive index in any part or in the neighborhood of the supergrating, or by any other method that varies the effective refractive index experienced by propagating light, and it will be appreciated that many embodiments are possible within the present invention.

The second defining property of the supergrating is that the grating resembles a sampled structure characterized by a set of sample points, each associated with a sample region. These sample regions, which may take a variety of shapes, are often referred to as refractive index pixels. The supergratings effective refractive index is substantially fixed within each pixel. This refers to the fact that transitions between the grating's index levels cannot occur at arbitrary positions, but, rather, must occur at boundaries of regions defined by the sample points. Thus, the BSG can be described by a series of (often binary) digits, indicating the refractive index setting at each sample point.

The third defining property of the supergrating is that an optical wave-front incident on the grating experiences multiple interactions with the grating features. That is, the supergrating operates in the Bragg diffraction regime.

Certain supergrating embodiments utilize a sequential array of refractive index pixels, meaning that each pixel is neighbored by only two other pixels, leading to a natural sense of ordering. Such embodiments are referred to as one-dimensional supergratings, and often utilize pixels in the shape of straight or curved lines, or arrays of boxes or dots arranged along the direction of propagation of incident light. It should be noted that these embodiments include the suitable variation of effective refractive index along the length of any waveguide confining propagation along one dimension.

Other supergrating embodiments utilize two-dimensional arrays of refractive index pixels wherein the pixels are situated on the same two-dimensional surface. This surface can be planar or curved. Such embodiments often make use of square or hexagonal pixels that are arranged along a suitable periodic lattice, although it may be appreciated that non-periodic arrangements, non-uniform pixels, or other pixel shapes may be suitable and are within the context of the present invention. It should be noted that these embodiments include the suitable variation of effective refractive index in the span of any waveguide confining propagation along two dimensions.

Additional supergrating embodiments utilize three-dimensional arrays of refractive index pixels. Here, the sample points may be situated anywhere or confined to any particular region of space. Such embodiments often make use of box-like or diamond-like pixels that are arranged along a suitable periodic lattice, although it may be appreciated that non-periodic arrangements, non-uniform pixels, or other pixel shapes may be suitable and are within the context of the present invention.

Referring now to FIG. 1, supergrating construction involves several key choices. First, Step 351 Selects the refractive index levels for the optical device, as determined from material parameters and lithographic or photoinscription constraints. Step 352 then determines the desired sample length, considering the desired wavelength range for the grating and the available lithographic resolution. Step 353 sets total device dimensions for the grating, limited by the available physical space and the technological limitations of the inscribing process. It will be appreciated that the methods described herein are for determining grating patterns for surface-relief gratings; however, in alternate embodiments the methods may be readily adapted to fiber grating patterns. The next step 354 converts the desired grating's reflectance specifications to the Fourier domain using the Fourier approximation. Guided by the Fourier approximation, the designer may initially design the grating by its Fourier spectrum. As will be shown below, this step can also implement feedback to account for various inaccuracies of the approximation in order to improve the final result.

Step 353, the Fourier approximation, is a mathematical relation that relates a grating's reflectance spectrum to one or more periodic reflectance spectra. In other words, single-wavelength gratings have reflectance spectra characterized precisely by their periodic structure, and simple superimposed gratings have reflectance spectra characterized by their wavelength or reflectance spectra components. Therefore, the reflectance spectrum of a grating may be related to the Fourier transform of its structure—the Fourier transform being the standard method for evaluating the "frequency content" or "wavelength content" of a waveform.

The next step 355 is quantization of the analog index profile. Delta-Sigma modulation is one such quantization technique that may be used and can be efficiently implemented. It will be appreciated that in alternate embodiments any suitable quantization technique that conserves Fourier information within a spectral band may be used.

Step 356 determines the supergrating's actual reflectance using an exact technique such as the known transfer matrix method. This calculation determines residual errors of the Fourier approximation, and quantifies an error that can be taken back into the Fourier domain and added to the result of the step 353 if step 357 determines that the error exceeds a predetermined threshold. This process can be repeated as necessary, although one repetition is often sufficient. It will be appreciated that any suitable technique for determining error between the desired reflectance characteristics and actual reflectance characteristics may be used.

In accordance with one aspect of the invention, deeper, or more profound, supergrating surface features reduce scattering losses due to radiative cladding modes by occupying a greater distance in the normal direction, which, from Huygens principle and Fourier considerations, leads to more robust phase-matching requirement in the normal dimension; thereby reducing (unwanted) scattering efficiency. More quantitatively, grating features are preferably deep-toothed to a depth exceeding the material wavelength $\lambda_{mat}=\lambda_0/n_{eff}$, and the decay constant of the modal tail is preferably less than $1/\lambda_{mat}$ in the grating region. In alternate embodiments of the invention, the BSG can be implemented in the core region at the mode's center. Thus, contributions from the normal extent of the grating are relatively equal, thereby enhancing cancellation of the scattered component.

In accordance with another aspect of the invention, grating features and optical characteristics may be varied one or more times after manufacture by employing any means of modifying material or effective refractive index locally or over an area. Several such methods of modifying material or effective refractive index include: affecting the temperature of any part or the neighborhood of the supergrating; electro-optic, magneto-optic, electro-strictive, or magneto-strictive tuning of any part or the neighborhood of the supergrating; optically illuminating, mechanically straining, or injecting current into any part or the neighborhood of the supergrating; incorporating an electrochromic material in any part or the neighborhood of the supergrating; incorporating a liquid crystal or optical polymer material in any part or the neighborhood of the supergrating; promoting chemical reaction or reconfiguration in any part or the neighborhood of the supergrating; or effecting a mechanical translation or reconfiguration of any part or the neighborhood of the supergrating. It will be appreciated that other methods for modifying material or effective refractive index, any one or combination of which are within the context of the present invention.

Some embodiments apply one or more methods of modifying material or effective refractive index to the entire supergrating or substantial parts or sections thereof, thereby effecting a general change in the supergrating's optical features. Such general changes include the strengthening or weakening of features, the enablement or disablement of supergrating features of the supergrating as a whole, the tuning of the optical phase of supergrating features, or the spectral shift of supergrating features. These embodiments address what we term a "tunable supergrating". These tunable supergratings may be used interchangeably with other supergratings to provide additional dynamic functionality in any device or embodiment where the latter are used. This is true in particular for all other device embodiments of the present invention.

Other embodiments apply one or more methods of modifying material or effective refractive index to individual pixels of the supergrating or groups thereof. Such embodiments may achieve spectral changes including the strengthening or weakening of features, the enablement or disablement of supergrating features of the supergrating as a whole, the tuning of the optical phase of the supergrating features, or the spectral shift of supergrating features, generally in greater extent than is possible with tunable supergratings. Furthermore, such embodiments may act to create spectral features that were previously not exhibited by the supergrating, remove spectral features that were previously exhibited, or even change the optical characteristics exhibited by the supergrating within a spectral band entirely. These embodiments address what we term a "programmable supergrating". These programmable supergratings may be used interchangeably with other supergratings to provide additional dynamic or programmable functionality in any device or embodiment where the latter are used. This is true in particular for all other device embodiments of the present invention. Particularly, embodiments of optical couplers, optical dispersion controllers, optical spatial separators, add/drop filters, lambda routers and wavelength equalizers wherein a programmable supergrating is used are possible, and represent much improved functionality.

Supergrating Coupler

Features of the present invention may be used in evanescent-wave couplers to provide wavelength dependent coupling and direction as well as dispersion compensation. For example, light may be coupled from one waveguide to another waveguide, with a desired spectral response: i.e., light at a given wavelength may be coupled fully, fractionally, or not at all, and with a desired phase.

The coupling embodiments may consist of two or more parallel asymmetric or symmetric waveguides (described below). The asymmetric waveguides have overlapping but differing modes, with differing effective (modal) indices $(n_{eff})_1$ and $(n_{eff})_2$ and different propagation vectors $k_1(\lambda_0)=2\pi(n_{eff})_1/\lambda_0$ and $k_2(\lambda_0)=2\pi(n_{eff})_2/\lambda_0$, where $\lambda_0$ is free-space wavelength. The effective indices will in general be dependent on wavelength $\lambda_0$. It will be appreciated that the amount of modal overlap and the characteristics of the supergrating will determine the wavelength(s) coupled from one waveguide to another and the direction the wavelength(s) will take once coupled.

Optical coupling may be classified into two general categories: counter-directional and co-directional. Light is said to be coupled co-directionally if the coupled light travels in the same general direction (within 90 degrees of) the input light. Light is said to be counter-directionally coupled if the coupled light travels generally in the opposite direction of the input light. These distinctions are most often very clear in practice as the counter- and co-directions are well defined by the optical waveguides. It should be noted that the same supergrating coupler may be used to couple both co- and counter-directionally, and may do either or both for each wavelength within one or more spectral bands. It is appreciated that while device operation is simpler to describe if only one mode of operation is considered, a device incorporating features of both embodiments simultaneously is within the present invention. It is also appreciated that in accordance with several embodiments of the present invention, the coupling characteristics of supergrating couplers may be varied after manufacture, most often by subjecting the supergrating or supergratings responsible for coupling to some form of optical tuning such as those mentioned previously. Any form of supergrating, including one-dimensional, two-dimensional or three-dimensional, and any particular method of effecting the required effective refractive index values is within the context of the present invention.

Counter-directional Supergrating Coupler Embodiments

Figure 2:
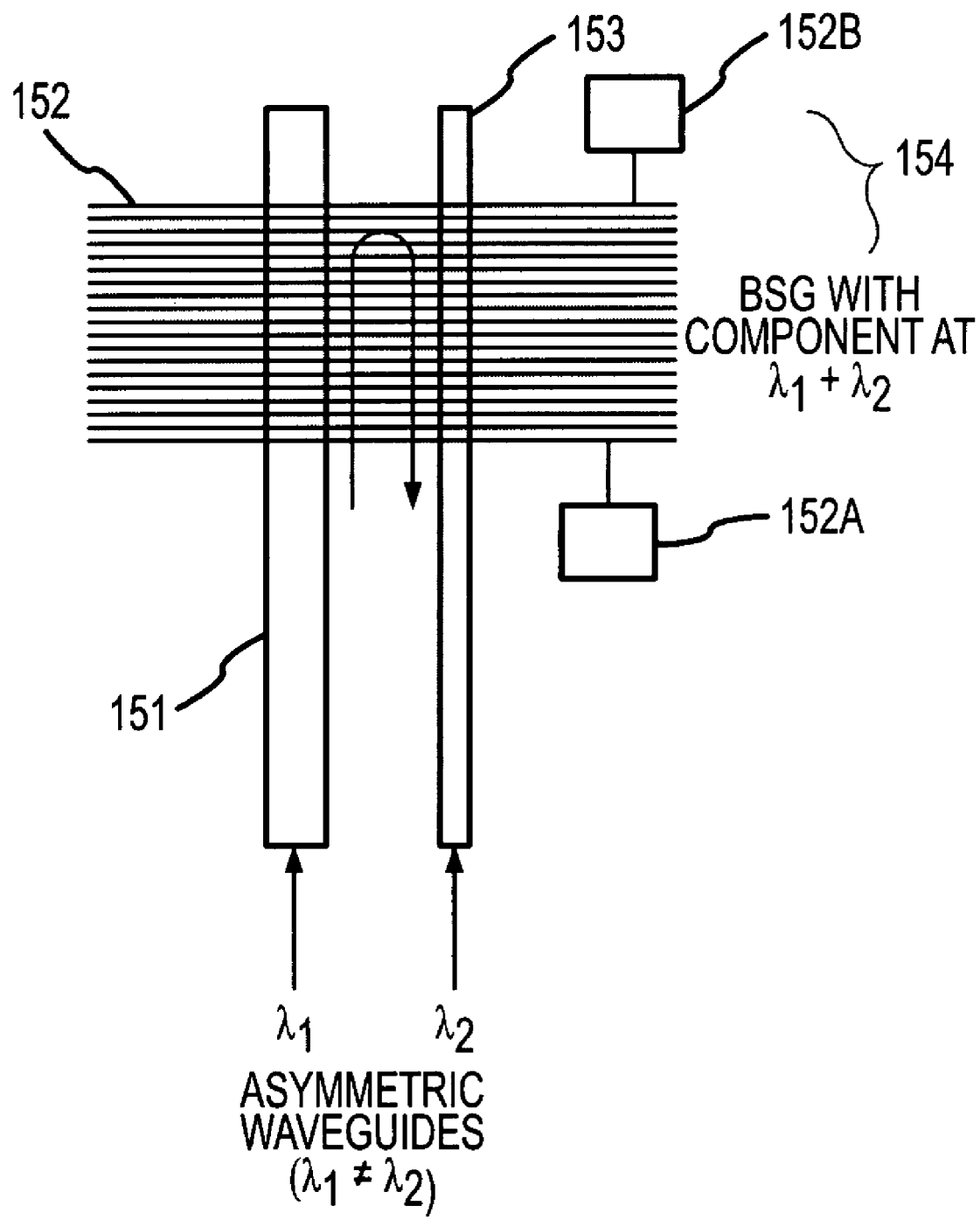
FIG. 2 shows a pictorial view of a counter directional coupler incorporating features of the present invention.

Referring now to FIG. 2 there is shown a pictorial illustration of a counter-directional supergrating coupler 154 incorporating features of the present invention. For this embodiment, counter-directional coupling will occur for a given input wavelength $\lambda_0$ when the index perturbation comprises a spatial frequency of $K_g(\lambda_0)=k_1(\lambda_0)+k_2(\lambda_0)$.

Again, this is accomplished by a constructing the supergrating 152, as described above, to emulate the desired spectrum of $K_g(\lambda_0)$ and situating the supergrating 152 between the evanescent-coupled waveguides 151, 153. In this embodiment, the supergrating 152 should preferably be free of spatial frequencies of $2k_1(\lambda_0)$ and $2k_2(\lambda_0)$, as these will produce back-reflection within the respective waveguides (i.e. no coupling), thereby decreasing coupling efficiency and yielding undesired back-reflection. Satisfying this condition requires that waveguide asymmetry be sufficient to avoid any overlaps between grating spatial frequencies ($K_g$'s) yielding inter-waveguide coupling and those yielding intra-waveguide coupling, over all wavelength range(s) of interest; mathematically, this can be expressed as:

$$k_1(\lambda_1)+k_2(\lambda_1) \neq 2k_1(\lambda_2) \text{ and } k_1(\lambda_1)+k_2(\lambda_1) \neq 2k_2(\lambda_2)$$

where $k_1$ and $k_2$ are defined earlier with wavelength-dependent effective indexes, and $\lambda_1$ and $\lambda_2$ are any combination of wavelengths lying within the range(s) of interest.

In alternate embodiments, optical BSG 152 characteristics may be programmable and/or tuneable by controller 152A and/or tuner 152B, respectively.

Co-directional Supergrating Coupler Embodiment

Figures 3, 3A:
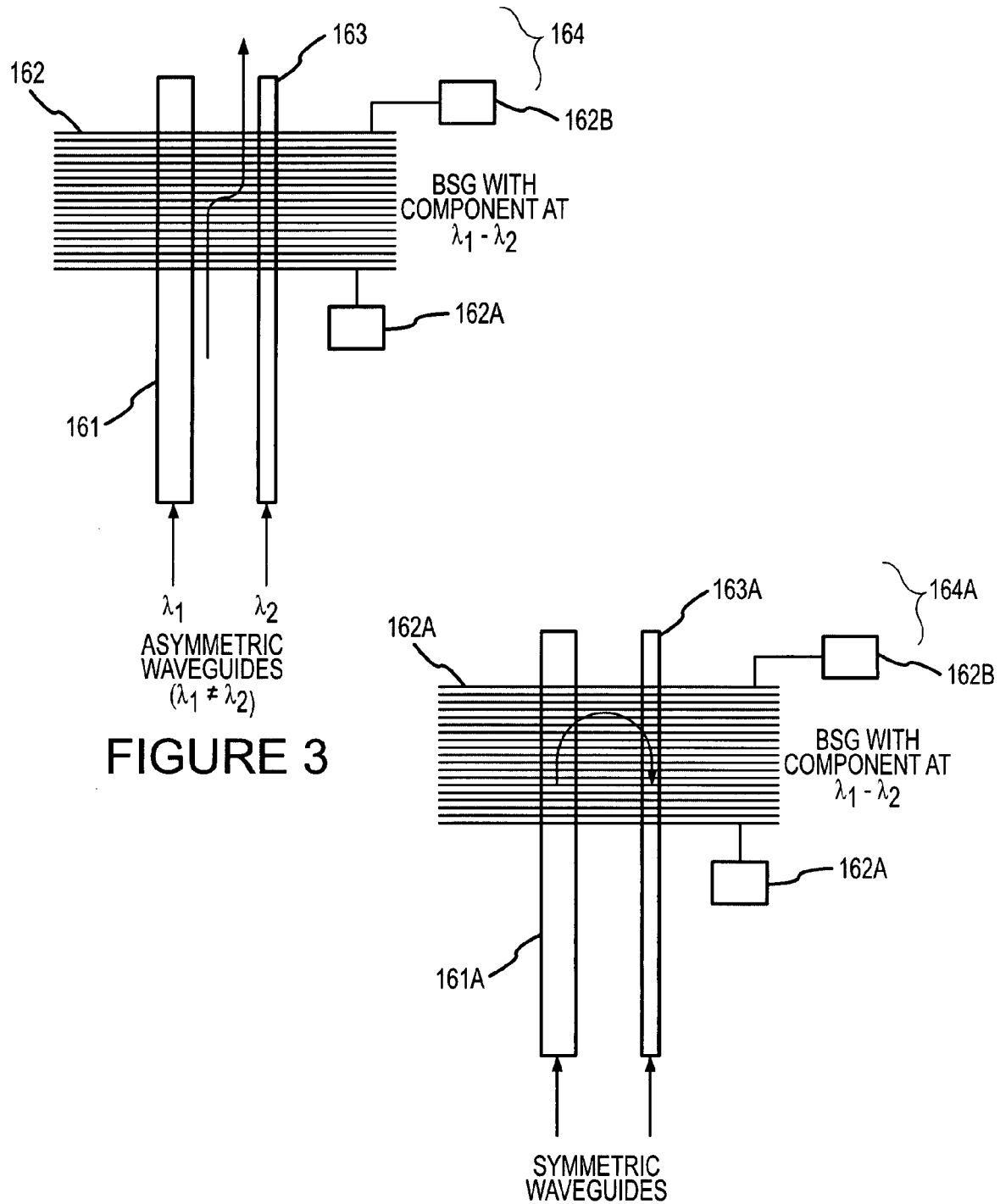
FIG. 3 shows a pictorial view of a co-directional coupler incorporating features of the present invention.
FIG. 3A shows a pictorial view of a counter-directional symmetrical waveguide coupler incorporating features of the present invention.

Referring to FIG. 3 there is shown a pictorial illustration of a co-directional supergrating coupler 164 incorporating features of the present invention. In this embodiment, a desired wavelength $\lambda$ will couple co-directionally from one waveguide 161 to the other 163, when the respective effective indexes are perturbed with spatial frequency $K_g(\lambda_0)=k_1(\lambda_0)-k_2(\lambda_0)$. This is accomplished by a constructing the supergrating 162, as described above, to emulate the desired spectrum of $K_g(\lambda_0)$ and situating the supergrating between the evanescent-coupled waveguides 161, 163.

In alternate embodiments the supergrating is part of the waveguide or on one or more sides of the waveguide. In addition, alternate embodiments optical BSG 162 characteristics may be changed by programmable controller 162A and/or tuner 162B, respectively.

Symmetric Supergrating Coupler Embodiment

Referring to FIG. 3A, it will be appreciated that the symmetric supergrating coupler 164A is a special case of the asymmetric supergrating coupler shown in FIG. 2, and performs similar functions as the asymmetric coupler 154 but allows the two waveguides 161A, 163A to be weakly asymmetric or even symmetric in their effective index. Thus, limitations expressed previously may be exceeded, independent of the fact that this would normally lead to intra-waveguide reflection.

In alternate embodiments the supergrating is part of the waveguide or on one or more sides of the waveguide. In addition, alternate embodiments may also change optical BSG 162 characteristics through programmable controller 162A and/or tuner 162B, respectively.

Figure 10:
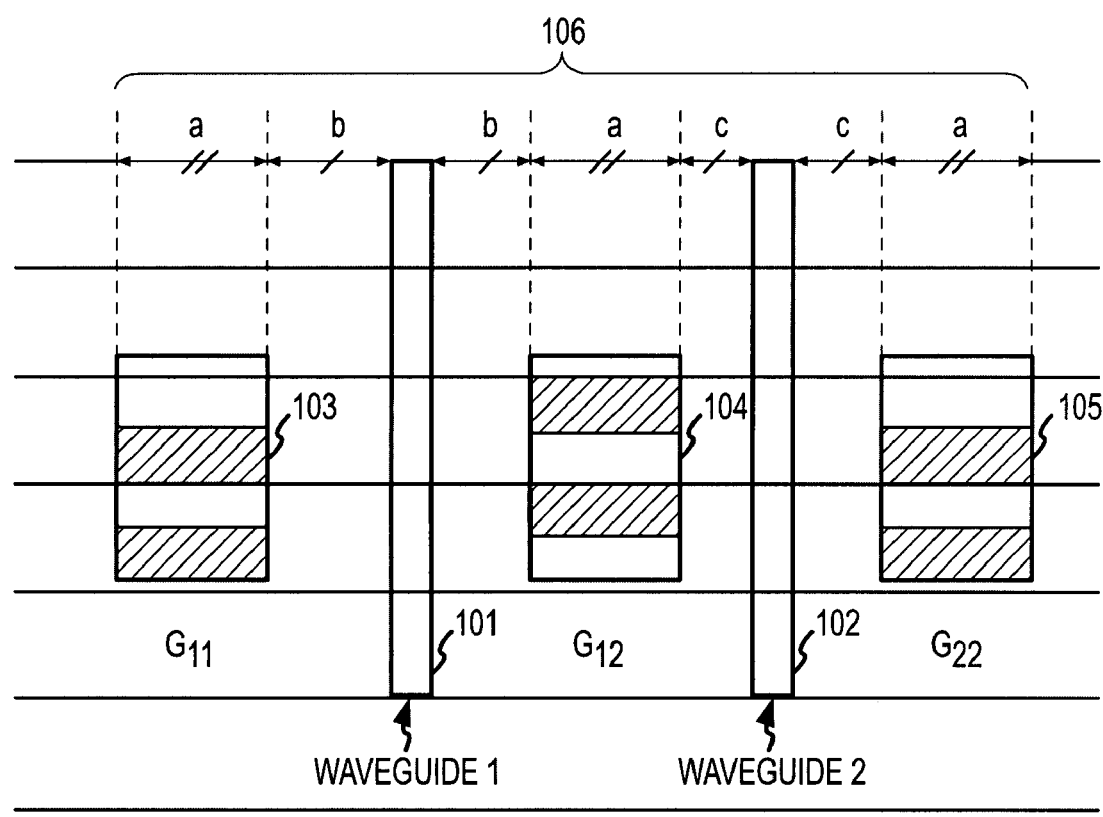
FIG. 10 is a pictorial diagram of an intra-waveguide suppression coupler incorporating features of the invention.

Referring to FIG. 10 there is shown a pictorial diagram of an intra-waveguide suppression coupler incorporating features of the invention. For example, a device 106 consisting of two waveguides 101, 102 (symmetric or otherwise) with a BSG 104 situated in between may be static, tunable, or programmable as necessary. Two more BSGs, 103, 105 identical to the first BSG 104, but with opposite contrast (1's become 0's and vice-versa), are placed on either side of the two waveguides 101, 102 such that they mirror the center BSG 104 about the corresponding waveguide.

The principle of operation is as follows: let $m_1$ be the modal profile of guide 1 and $m_2$ be the modal profile of guide 2. The coupling coefficients relating the two waveguides can be written to first order in grating strength as:

$$C_{12} \propto \int m_1^* m_2 G_{12} + \int m_1^* m_2 (G_{11}+G_{22}) \cong \int m_1^* m_2 G_{12},$$

where $G_{12}$ is the center grating 104 and $G_{11}$ 103 & $G_{22}$ 105 are the gratings on the far side of waveguides 1 and 2, respectively. The second term is negligible because the two side gratings 103, 105 are very far from the corresponding opposite waveguide (more precisely, the opposite waveguide's modal profile is negligible in this region).

However, the coupling coefficient from the first waveguide 101 to itself (corresponding to intra-waveguide reflection) follows:

$$C_{11} \propto \int |m_1|^2 G_{11} + \int |m_1|^2 G_{12} = 0 \text{ (because } G_{11} = -G_{22} \text{ and symmetry)}$$

The result is identical for the second waveguide 102. The only assumption necessary for the cancellation is that the modal profiles of both waveguides 101, 102 be symmetric (about their waveguide, not necessarily identical to each other) and that the gratings be properly symmetrized about the guide. The cancellation is independent of many material parameters such as the waveguides' effective indices, even if they vary independently.

It will be appreciated that the invention advantageously allows for efficient coupling between neighboring symmetric waveguides, while suppressing intra-waveguide reflection.

It will be further appreciated that the invention advantageously allows for efficient coupling between neighboring symmetric waveguides, while suppressing intra-waveguide reflection. It is appreciated that the invention is equally applicable to asymmetric waveguides, and in alternate embodiments may be the preferred embodiment in light of its relaxation of the design requirements.

Coupler Folding

In another embodiment of the present invention, one supergrating coupler may be folded to make better use of chip real estate. This is done by cascading supergrating couplers. The exact choice of connection order or direction depends on the directionality of coupling of the wavelengths of interest, and a combination of operating modes may be used at one time. The several supergrating couplers may be used together to form one or more improved couplers, or to subject input light to several stages of filtering of processing.

Figure 4:
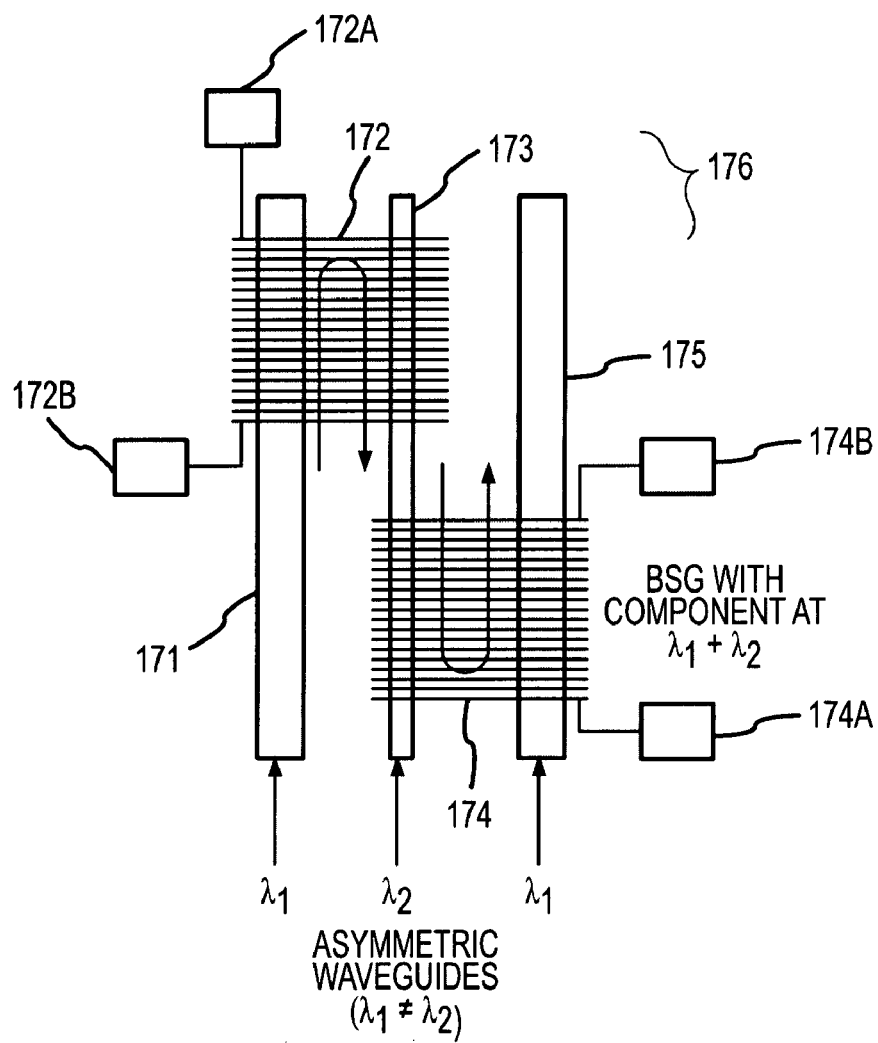
FIG. 4 shows a pictorial view of a dispersion compensator incorporating features of the present invention.

FIG. 4 represents a cascaded counter-directional coupler 176 embodiment. In this embodiment wavelength $\lambda_1$ is counter-directionally coupled from waveguide 171 to waveguide 173, and again counter directionally coupled from waveguide 173 to waveguide 175. It will be appreciated that waveguide 173 may be adapted to compensate for dispersion in waveguide 171.

In alternate embodiments optical BSG 172 characteristics may be programmed and/or tuned through programmable controller 172A and/or tuner 172B, respectively. Likewise, optical BSG 174 characteristics may be programmed and/or tuned through programmable controller 174A and/or tuner 174B, respectively.

Optical Circulator-based Couplers

Figure 5:
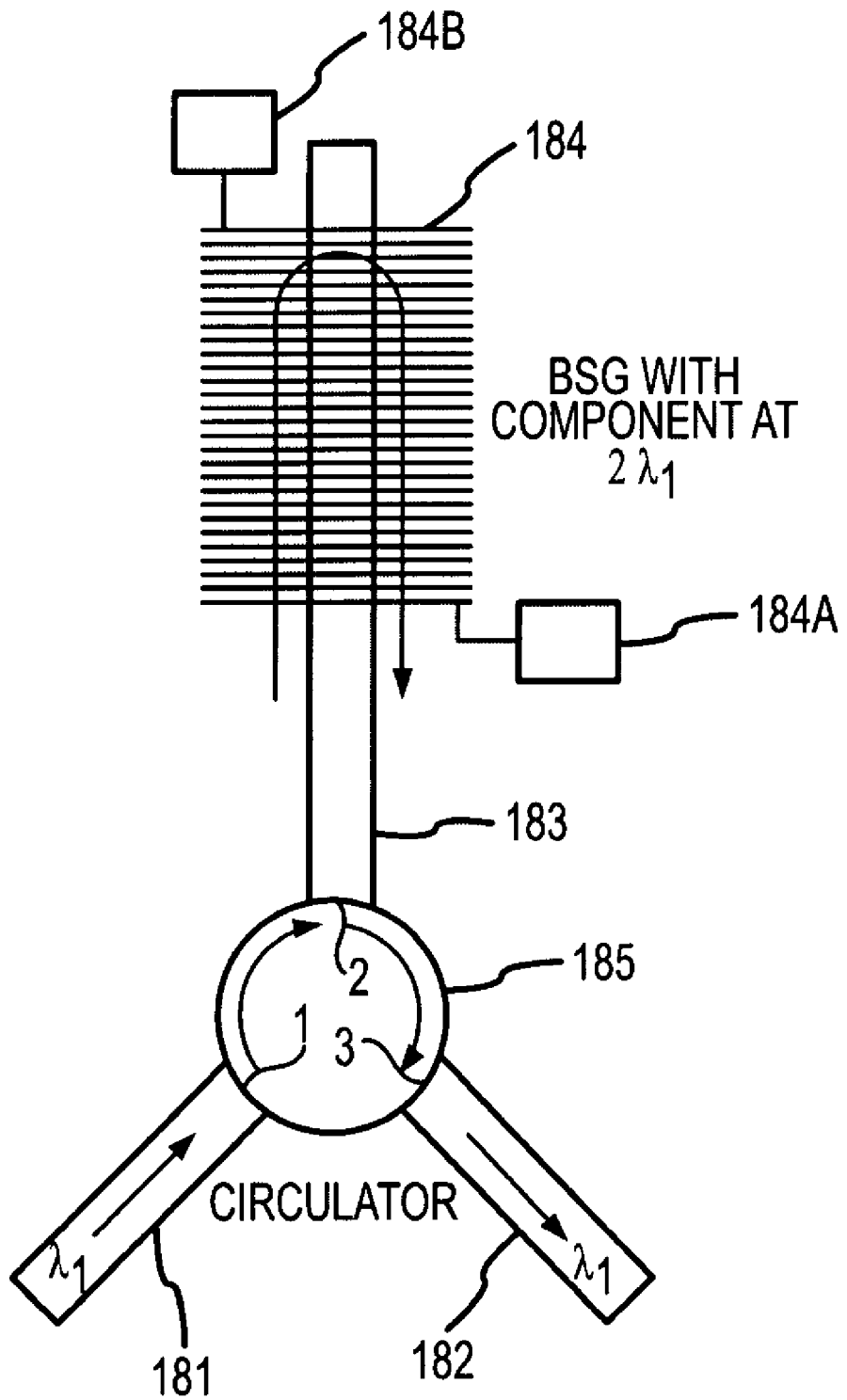
FIG. 5 shows a pictorial view of an alternate embodiment of a dispersion compensator incorporating features of the present invention.

FIG. 5 illustrates another embodiment of the present invention wherein a supergrating optical coupling between two or more waveguides is achieved by means of a supergrating operating in a reflective mode. Light incident through an input waveguide enters an optical circulator through port 1 and is transmitted through to port to. At port 2, the light is incident on a supergrating and selectively reflected in amplitude and phase and as a function of wavelength back to port two. The optical circulator acts to direct the light returning to port 2 to port 3, wherein it is collected by an output waveguide. The circulator based embodiment has the advantage that it is very suitable to situations where the waveguides are optical fibers as fiber based circulators are readily available. optical BSG 184 characteristics may be programmed and/or tuned through programmable controller 184A and/or tuner 184B, respectively.

Dispersion Compensator Embodiment

In the field of optical transmission, it is well known that optical networks must contend with a property known as dispersion. This property arises from the wavelength-dependence of effective index, which in turn produces a wavelength-dependent group delay spectrum for a given type and length of optical fiber. Since an optical pulse always possesses some spectral width, this wavelength-dependence leads to different retardation of various spectral components of the optical pulse, thereby leading to its spread in the spatial domain. This spread directly impedes the operation of the optical network.

Chirped Bragg Gratings are grating devices targeted at dispersion compensation. Here a Bragg grating's pitch $\Lambda$ is varied along its length. This produces a wavelength-dependent phase spectrum which can be tailored to provide the desired group delay spectrum: $\tau_g = -d\phi/d\omega$. The delay for a given free-space wavelength $\lambda_0$ then follows from the round-trip distance to where local pitch has $\lambda_0$ as its Bragg wavelength: $\tau_g(\lambda_0) = 2n_{eff} z(\lambda_0)$, where $z(\lambda_0)$ is the spatial coordinate at which $\Lambda(z) = \lambda_0/2n_{eff}$. In practice, however, these implementations suffer from excessive group-delay ripple, indicating that the dispersion compensation is not complete.

In the present invention a supergrating emulating the effect of a chirped Bragg grating may be implemented by determining the ideal (analog) input chirp function, as derived from the group delay spectrum $\tau_g(\lambda_0)$ (grating-imposed delay is preferably the opposite of that at the input). The ideal analog profile is then fed into the previously described supergrating quantization filter, producing a quantized profile that emulates the desired phase characteristics. The quantization filter may be further optimized as described above to minimize phase noise.

In other embodiments of the present invention the supergrating may be synthesized directly from the required phase-delay characteristics, for instance by Fourier-based synthesis of the specifications.

Different embodiments of the present invention may comprise supergrating couplers, as described above. These couplers may include co-directional and counter-directional couplers, optical circulator based couplers, folded couplers, or any combination of these, but not limited to these. It is appreciated that any optical transmission or direction method wherein a one or more supergratings affect the transmitted or directed light may support the desired optical phase characteristics and is hence within the context of the present invention.

Alternate embodiments of the present invention may involve one or more supergratings adapted to influence light as it is transmitted through the length of a waveguide. These transmission-based embodiments are particularly useful for optical fiber implementations.

Wavelength Stability Monitor Embodiments

To function properly, optical networks require that channel wavelengths remain within some range of their nominal value. Drifting can be caused by a number of factors, including variations in environmental conditions, device aging, and mechanical disruptions. In certain situations, the incident wavelength channel may remain within the range of nominal values but the characteristics of a device processing this wavelength channel may shift relative to it. A supergrating device may be used to track such deviations and provide feedback to this device, or to a subsequent device attempting to correct the problem.

Figure 6:
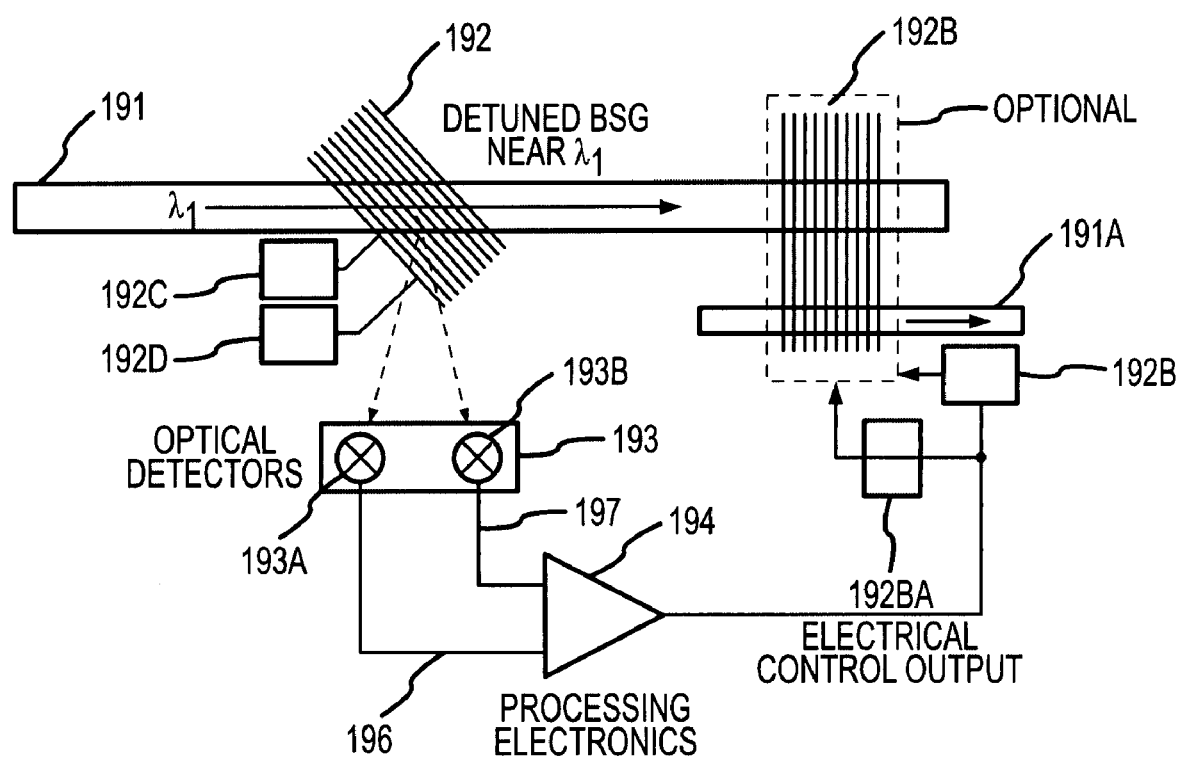
FIG. 6 shows a pictorial view of a wavelength monitor incorporating features of the present invention.

Wavelength drift can be monitored using a 1D supergrating 192 as shown in FIG. 6. While light incident at a given input angle on tilted 1D grating 192 will nominally diffract at only a particular output angle, detuning from a central peak-reflectance wavelength will in fact yield a detuning in angle, along with a decrease in diffraction efficiency.

This behavior can be used to detect shifts in wavelength, or, assuming the wavelength to be true, shifts in device characteristics which can then be compensated through a variety of mechanisms (e.g. temperature tuning). This may be accomplished by placing photodetectors 193a, 193b symmetrically aligned along the diffraction path of the desired central wavelength; in this configuration, the signal from each will match if local wavelength matches the desired value. (Note that diffraction efficiency will normally be intentionally low, so that most power passes through un-deviated.) Deviations in local wavelength are then manifest by a change in the relative values of the photodetectors 193a, 193b, which is monitored by comparator 194. Comparator 194 may determine a difference between the input signals on paths 196, 197, or any suitable sensitivity function may be used, such as a logarithmic subtraction. These deviations can then be corrected for using temperature or any other influencing parameter (not shown).

In alternate embodiments optical BSG 192 characteristics may be programmed and/or tuned through programmable controller 192c and/or tuner 192d, respectively.

Figure 7:
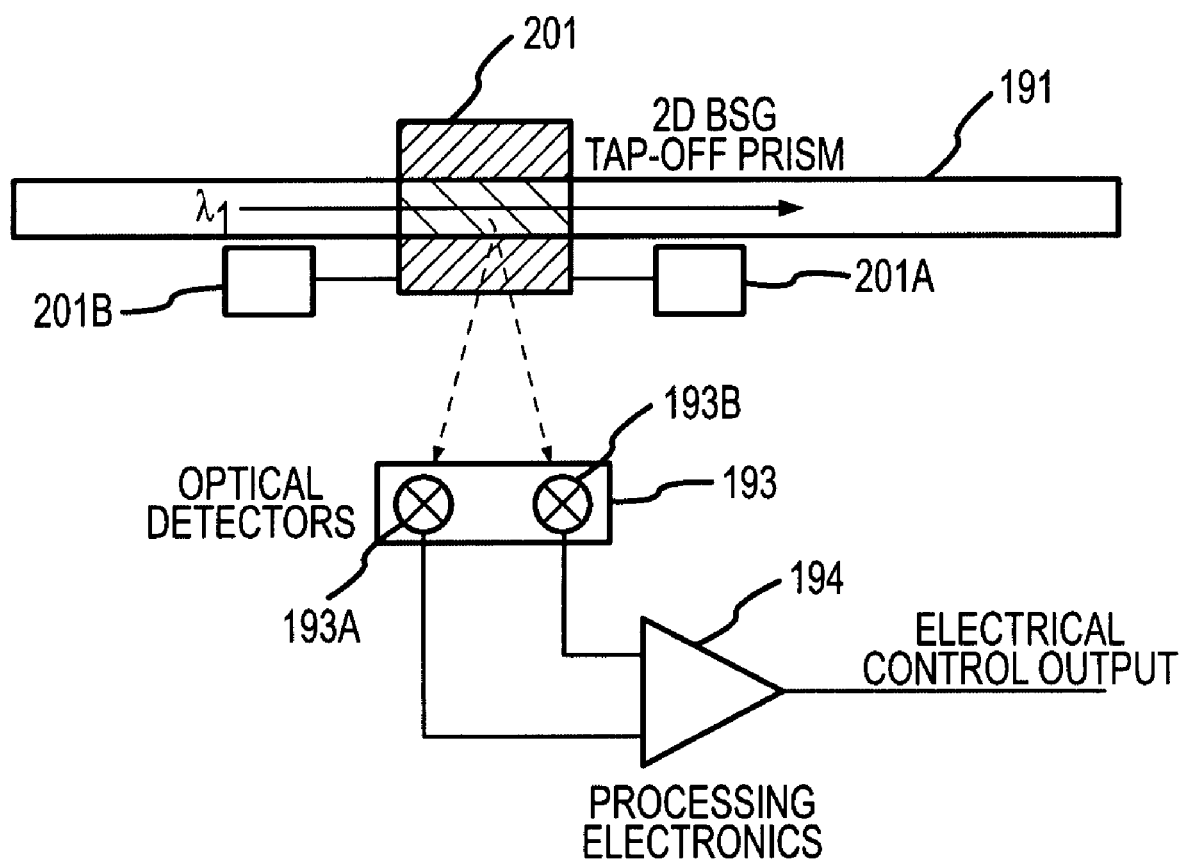
FIG. 7 shows a pictorial view of a wavelength monitor incorporating features of the 2D embodiment of the present invention.
Figure 8:
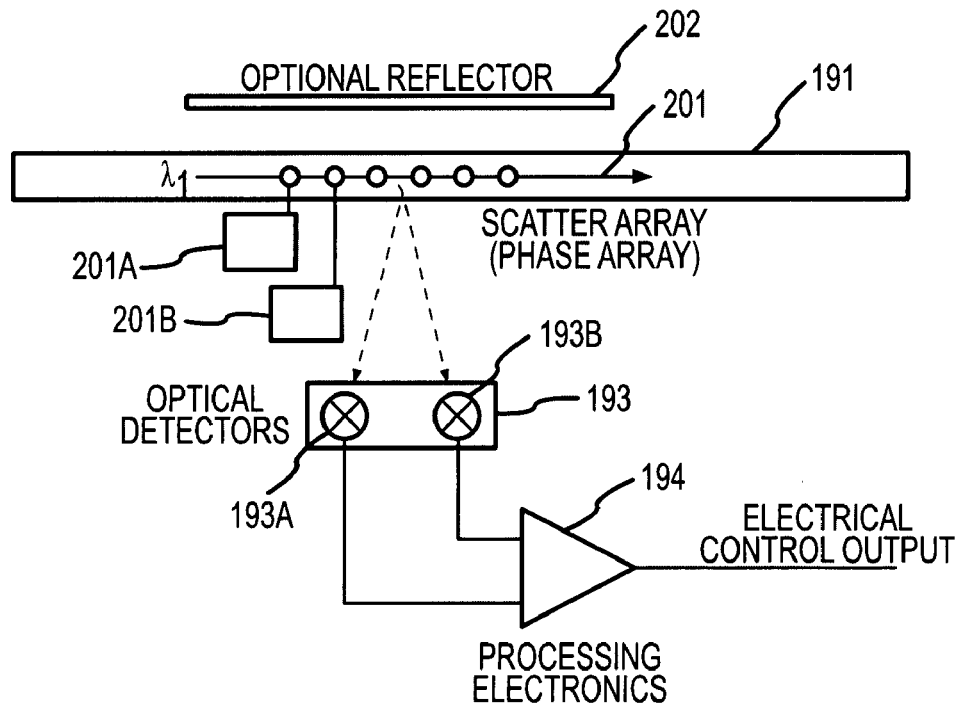
FIG. 8 shows a pictorial view of a wavelength monitor incorporating features of the point scatterer array embodiment of the present invention.

Another embodiment of the present invention uses a 2D BSG 201 as shown in FIG. 7, which may be used to diffract light to the detectors and/or detect drifts in wavelength on several channels simultaneously; or in another embodiment, with a sequence of quasi-1D (i.e. point-source) features 201 etched along a waveguide as shown in FIG. 8, which will lead to symmetric diffraction in both lateral directions. A mirror 202 can optionally be etched at one side, for optimal collection of scattered light.

Dynamic Multi-wavelength Equalizer

According to several embodiments of the present invention dynamic equalization of multi-wavelength light may be effected. These embodiments comprise one or more supergratings to attain wavelength-specific optical gain or loss characteristics, and thereby effect equalization. The dynamic behavior may be attained by utilizing one or more programmable or tunable supergratings.

A dynamic multi-wavelength equalizer according to the present invention may be preceded by first routing input wavelengths through a tap-off network monitor that separates channels and monitors their power (see FIGS. 6 and 7). These signals are sent through processing electronics 194, whose output tunes (or programs) the one or more supergratings of the multi-wavelength equalizer 192B, which equalize the power across channels 191, 191A. Such a configuration may be used as part of a feedback configuration to balance wavelength power.

According to some embodiments of the present invention one or more supergratings are used to couple input channels to an output waveguide with lower efficiency for wavelengths whose power must be trimmed. These embodiments may comprise one or more supergrating couplers. Other embodiments of the present invention include using supergrating to impose higher scattering losses for wavelengths whose power must be trimmed.

In alternate embodiments a cascade of BSGs that include "basis functions" can be independently tuned to effect the loss spectrum required for equalization; possible basis functions include step-like spectra that can be shifted relative to one another.

Further alternate embodiments include using a programmable supergrating device whose refractive index features are modified to effect the desired equalization. Particular embodiments include: a cascade of co- and counter-directional BSGs (see FIGS. 2, 3, 3A, and 4), which successively divide the channels in two sub-bands until individual channels are extracted; and a sequence of tilted single-channel gratings which direct individual channels to their respective output waveguide or detector device (FIG. 6, item 193).

Static and Dynamic Add/Drop Filter Embodiment

According to several embodiments of the present invention individual or multiple wavelength channels may be fully or partially spatially separated from an "in" channel and directed to a "drop" channel. Other wavelength channels may be directed from the "in" channel to an "out" channel. Optionally, an "add" channel may be provided, wherein light from the "add" channel may be selectively directed to the "through" channel. Other embodiments may comprise several "drop", "add" or "through" channels. The device functionality in both types of embodiments may be fixed or programmable.

Figure 4A:
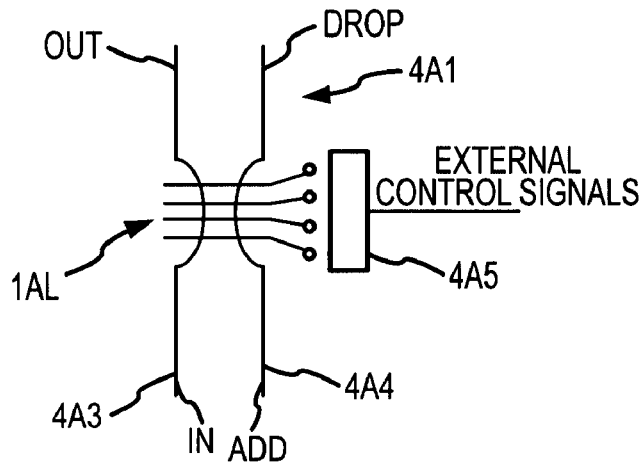
FIG. 4A shows a pictorial view of a dynamic add/drop filter embodiment incorporating features of the present invention.

Referring to FIG. 4A, there is shown a device 4A1 consisting of a set of waveguides 4A3, 4A4 coupled using tunable and/or programmable or fixed counter- and/or co-directional supergrating couplers.

Figure 4B:
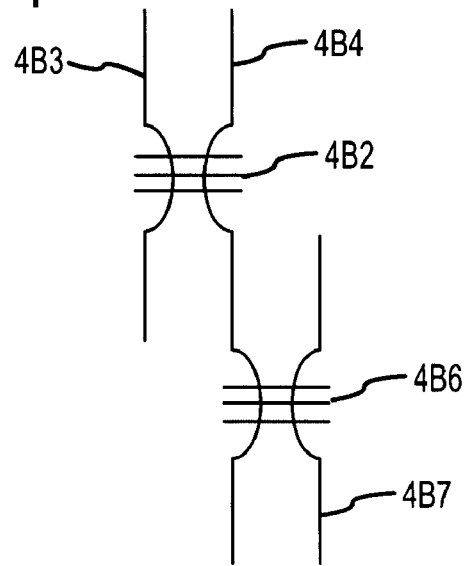
FIG. 4B shows a pictorial view of multiple waveguides coupled with programmable BSGs incorporating features of the present invention.

Another embodiment FIG. 4B makes use of the Vernier tuning principle, with a design motivated by the principle that the spectral shifts accessible through index tuning are often much less than the total desired tuning range. Multi-channel input enters along one waveguide 4B3, with light coupled to an adjacent waveguide by a multi-peak tunable supergrating 4B2 (with peak spacing generally less than the available tuning range). A subsequent tunable supergrating 4B6 (generally multi-peak with a different spacing which is also less than the available tuning range) couples a subset of this first set of channels to a third waveguide 4B7. This decimation process can continue as desired, with the supergratings independently tuned relative to one another to drop desired channel(s). The channel selection range can thus greatly exceed the available index-tuned spectral shift.

Other embodiments of the present invention include using a two-dimensional or three-dimensional supergrating to direct light into the appropriate channel.

A particular embodiment of the invention can be used to spatially separate all of the wavelength components of an input optical signal.

Lambda Router Embodiment

Figure 9:
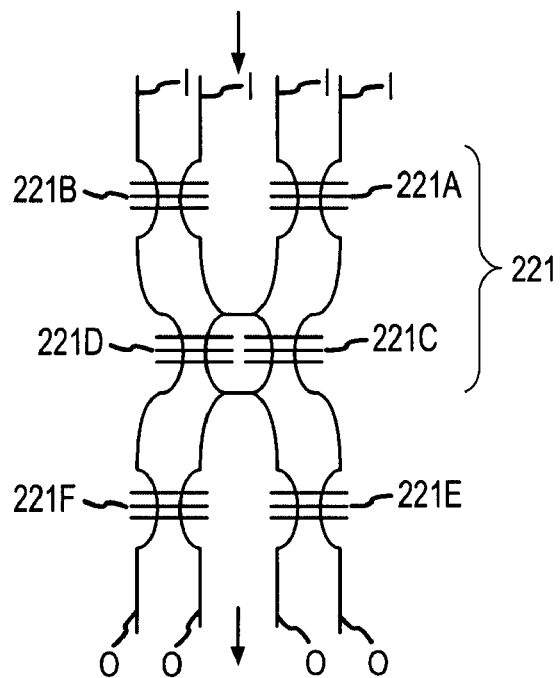
FIG. 9 is a diagram of a Lambda router incorporating features of the present invention.

A Lambda router incorporating features of the present invention is shown in FIG. 9. Lambda routers are also known as called wavelength routers, or optical cross-connects (OxCs)—and are devices positioned at network junction points which route wavelength(s) from a specific fiber optic input to another specific fiber optic output. Lambda routers are generally NxN devices (i.e. with N input fibers I and N output fibers O), with each input fiber typically conveying a single wavelength channel.

Cross/bar operation (i.e. channel light on one waveguide will couple to the other, and vice versa; or will remain on the same waveguide) is achieved by locally tuning and/or programming the supergratings 221A-221F in or out of alignment with the channel wavelength.

Another embodiment of the present invention comprises one or more supergrating couplers to effect the desired routing. Other embodiments comprise one or more add/drop filters.

Wavelength Monitor

According to another embodiment of the present invention, a supergrating device may measure the power in one or more optical wavelength channels. Several embodiments of this device comprise one or more supergratings and one or more optical detectors. Alternative embodiments include one or more supergrating couplers or one or more two- or three-dimensional supergratings.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. An optical component comprising at least one optical supergrating that is re-programmable by a controller coupled to the optical component to change a quantized refractive index profile of the supergrating, wherein the quantized refractive index profile is adapted to exhibit a finite plurality of refractive indexes that display intended Fourier transform characteristics in at least one spectral band.

2. An optical coupler comprising:
the optical component as in claim 1, wherein the optical component is adapted to affect at least one chosen optical wavelength;
a first optical waveguide; and
a second optical waveguide, wherein the second optical waveguide is optically coupled to the first optical waveguide via the optical component.

3. A co-directional optical coupler comprising:
the optical coupler as in claim 2, wherein the optical component is adapted to co-directionally couple at least one chosen wavelength.

4. A method of controlling the optical phase characteristics of at least one optical signal, the method comprising:
providing an optical component, wherein the optical component comprises:
at least one optical supergrating, wherein the at least one optical supergrating comprises a quantized refractive index profile,
a controller coupled to the optical component to control the quantized refractive index profile of the supergrating, wherein the at least one optical supergrating is re-programmable by the controller coupled thereto to exhibit a finite plurality of refractive indexes that display intended Fourier transform characteristics in at least one spectral band; and
adapting the at least one optical component to control the optical phase of the at least one optical signal.

5. An optical component comprising at least one scattering reducing optical supergrating, wherein the at least one scattering reducing optical supergrating comprises:
a quantized refractive index profile, wherein the quantized refractive index profile is adapted to exhibit a finite plurality of refractive indexes adapted to generate spectral characteristics in at least one spectral band; and
at least one grating feature dimension exceeding grating material wavelength $\lambda_{mat}=\lambda_0/n_{eff}$, and a decay is constant of the modal tail less than $1/\lambda_{mat}$ in a predetermined region of the at least one scattering reducing optical supergrating.

6. An optical component comprising at least one multi-dimensional optical supergrating, wherein the at least one multi-dimensional optical supergrating comprises a quantized refractive index profile, wherein the at least one multi-dimensional optical supergrating is re-programmable by a controller coupled to the optical component to change the quantized refractive index profile, wherein the quantized refractive index profile is adapted to exhibit a finite plurality of refractive indexes that display intended Fourier transform characteristics in at least one spectral band.

7. An optical coupler system for coupling light between waveguides, the optical coupler comprising:
at least one first optical waveguide;
at least one second optical waveguide; and
at least one optical component optically coupling the light from the at least one first optical waveguide to the at least one second optical waveguide, the at least one optical component comprising an optical supergrating that comprises:
a quantized refractive index profile; and
a controller coupled to the optical component to change the quantized refractive index profile, wherein the quantized refractive index profile is adapted by the controller to exhibit a finite plurality of refractive indexes that display intended Fourier transform characteristics in at least one spectral band.

8. An optical coupler system as in claim 7 wherein the at least one first optical waveguide is optically asymmetric with the at least one second optical waveguide.

9. An optical coupler system as in claim 7 wherein the optical coupler system further comprises at least one second optical coupler, wherein the at least one optical coupler and the at least one second optical coupler are adapted to control intra-waveguide reflection.

10. An optical coupler system as in claim 7 wherein the optical coupler system is adapted to couple light counter-directionally to the uncoupled light.

11. An optical coupler system as in claim 7 wherein the optical coupler system is adapted to couple light co-directionally to the uncoupled light.

12. An optical dispersion control system comprising:
at least one optical component adapted to generate optical phase characteristics in at least one spectral band, wherein the at least one optical component comprises an optical supergrating that comprises:
a quantized refractive index profile; and
a controller coupled to the optical supergrating, the optical supergrating being re-programmable by the controller, wherein the quantized refractive index profile is adapted by the controller to exhibit a finite plurality of refractive indexes that display intended Fourier transform characteristics in at least one spectral band.

13. An optical dispersion control system comprising:
an optical coupler system for coupling light between waveguides, wherein the optical coupler system is adapted to exhibit wavelength-dependent optical phase characteristics, the optical coupler system comprising:
at least one first optical waveguide;
at least one second optical waveguide;
at least one optical component optically coupling the light from the at least one first optical waveguide to the at least one second optical waveguide, the at least one optical component comprising an optical supergrating that comprises:
a quantized refractive index profile; and
a controller coupled to the optical supergrating, the optical supergrating being re-programmable by the controller, wherein the quantized refractive index profile is adapted by the controller to exhibit a finite plurality of refractive indexes that display intended Fourier transform characteristics in at least one spectral band.

14. An optical device for separating wavelength components of an optical signal, the optical device comprising:
at least one optical wavelength separation system, the at least one optical wavelength separation system comprising:
at least one first optical waveguide;
at least one second optical waveguide; and
at least one optical component optically coupling the at least one optical wavelength from the at least one first optical waveguide to the at least one second optical waveguide, the at least one optical component comprising an optical supergrating that comprises:
a quantized refractive index profile, and
a controller coupled to the optical supergrating, the optical supergrating being re-programmable by the controller, wherein the quantized refractive index profile is adapted by the controller to exhibit a finite plurality of refractive indexes that display intended Fourier transform characteristics in at least one spectral band.

15. An optical wavelength equalizer comprising at least one optical component, the at least one optical component comprising an optical supergrating, a controller coupled to the optical supergrating, the optical supergrating being re-programmable by the controller, the optical supergrating comprising a quantized refractive index profile controlled by the controller to change, the quantized refractive index profile to exhibit a finite plurality of refractive indexes that display intended Fourier transform characteristics in at least one spectral band, and wherein the at least one optical component is adapted to adjust wavelength power per wavelength in an optical signal.

16. An optical wavelength equalizer as in claim 15 further comprising an optical coupler system, the optical coupler comprising:
at least one first optical waveguide;
at least one second optical waveguide; and
the at least one optical component optically coupling the adjusted wavelength from the at least one first optical waveguide to the at least one second optical waveguide.

17. An optical wavelength equalizer as in claim 15 wherein the at least one optical component is adapted to diffract chosen wavelengths.

18. An optical wavelength monitor comprising:
at least one optical component, the at least one optical component comprising an optical supergrating that is re-programmable by a controller coupled to the optical component to change a quantized refractive index profile of the supergrating, so as to exhibit a finite plurality of refractive indexes adapted to generate spectral characteristics in at least one spectral band, and wherein the at least one optical component is adapted to measure power per wavelength in an optical signal.

19. An optical component comprising at least one optical supergrating that is re-programmable by a controller coupled to the optical component to change a quantized refractive index profile of the supergrating so as to exhibit a finite plurality of refractive indexes that display intended Fourier transform characteristics in at least one spectral band.

20. An optical component as in claim 19 wherein the at least one optical supergrating further comprises at least one thermally responsive optical supergrating adapted to change spectral characteristics in response to thermal energy.

21. An optical component as in claim 19 wherein the at least one optical supergrating is adapted to electro-optic re-programming, magneto-optic re-programming, electrostrictive re-programming, and/or magneto-strictive re-programming.

22. An optical component as in claim 19 wherein the at least one optical supergrating is adapted to optical illumination re-programming, mechanical reconfiguration, mechanical straining re-programming, and/or current injection re-programming.

23. An optical component as in claim 19 wherein the at least one optical supergrating is adapted to electrochromic re-programming.

24. An optical component as in claim 19 wherein the at least one optical supergrating is adapted to optical polymer re-programming.

25. An optical component as in claim 19 wherein the at least one optical supergrating is adapted to molecular reconfiguration re-programming.

26. A method as in claim 4 wherein the optical component optically couples light from at least one first optical waveguide to at least one second optical waveguide.

27. A method as in claim 26 wherein the at least one first optical waveguide is optically asymmetric with the at least one second optical waveguide.

28. The optical component of claim 5, wherein the optical supergrating is re-programmable by a controller to change the quantized refractive index profile.

29. An optical component as in claim 6 wherein the at least one multi-dimensional optical supergrating further comprises at least one thermally responsive optical supergrating adapted to change spectral characteristics in response to thermal energy.

30. An optical component as in claim 6 wherein the at least one multi-dimensional optical supergrating is adapted to electro-optic re-programming, magneto-optic re-programming, electro-strictive re-programming, and/or magneto-strictive re-programming.

31. An optical component as in claim 6 wherein the at least one multi-dimensional optical supergrating is adapted to optical illumination re-programming, mechanical reconfiguration, mechanical straining re-programming, and/or current injection re-programming.

32. An optical component as in claim 6 wherein the at least one multi-dimensional optical supergrating is adapted to optical illumination re-programming, mechanical reconfiguration, mechanical straining re-programming, and/or current injection re-programming.

* * * * *

UNITED STATES PATENT AND TRADEMARK OFFICE
CERTIFICATE OF CORRECTION

PATENT NO. : 7,373,045 B2
APPLICATION NO. : 10/188530
DATED : May 13, 2008
INVENTOR(S) : Levner et al.

It is certified that error appears in the above-identified patent and that said Letters Patent is hereby corrected as shown below:

| Column, Line | Reads | Should Read |
|---|---|---|
| Cover page (63) | "Provisional application No. 60/302,904, filed on Jul. 3, 2001." | -- Provisional application No. 60/302,904, filed on Jul. 3, 2001. Provisional application No. 60/393,209, filed on Jul. 1, 2002. -- |

Signed and Sealed this
Eleventh Day of January, 2011

David J. Kappos
*Director of the United States Patent and Trademark Office*